Sept. 15, 1953 J. SCHWINDT 2,651,858
DITCHING PLOW ADJUSTMENT MECHANISM
Filed July 16, 1951 2 Sheets-Sheet 1
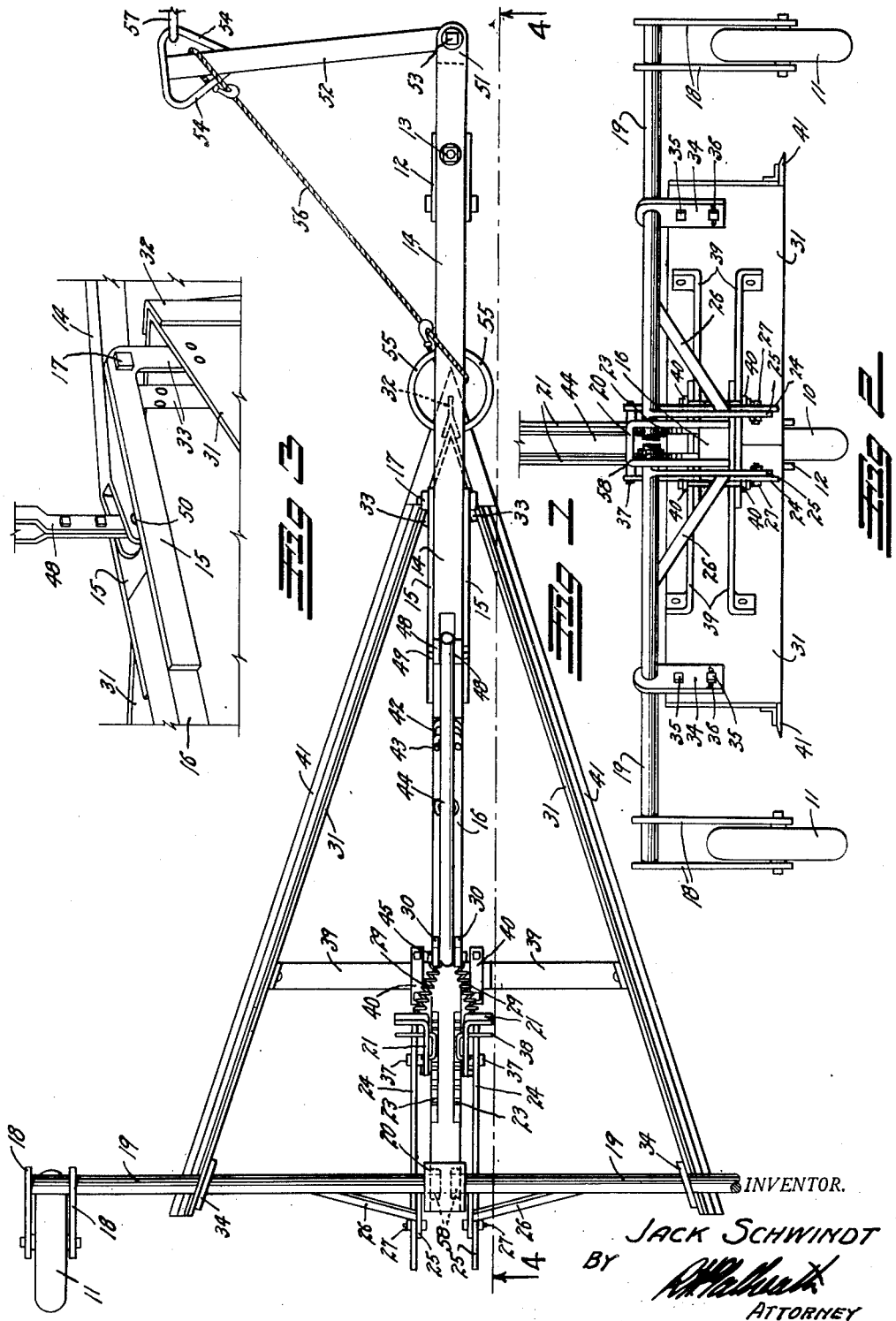
INVENTOR.
JACK SCHWINDT
BY
ATTORNEY Sept. 15, 1953   J. SCHWINDT   2,651,858
DITCHING PLOW ADJUSTMENT MECHANISM
Filed July 16, 1951   2 Sheets-Sheet 2
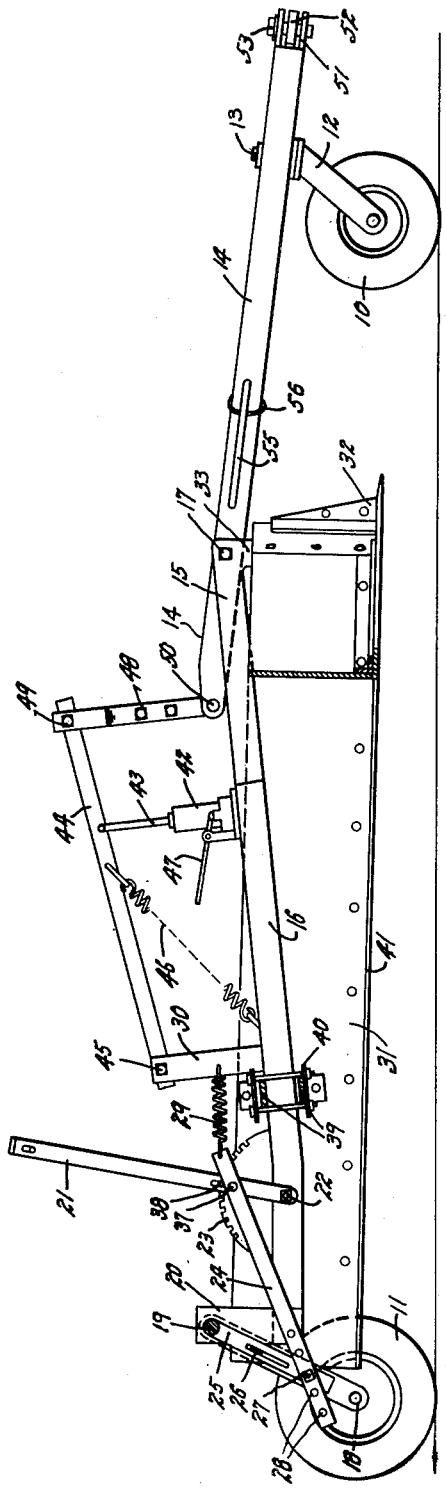
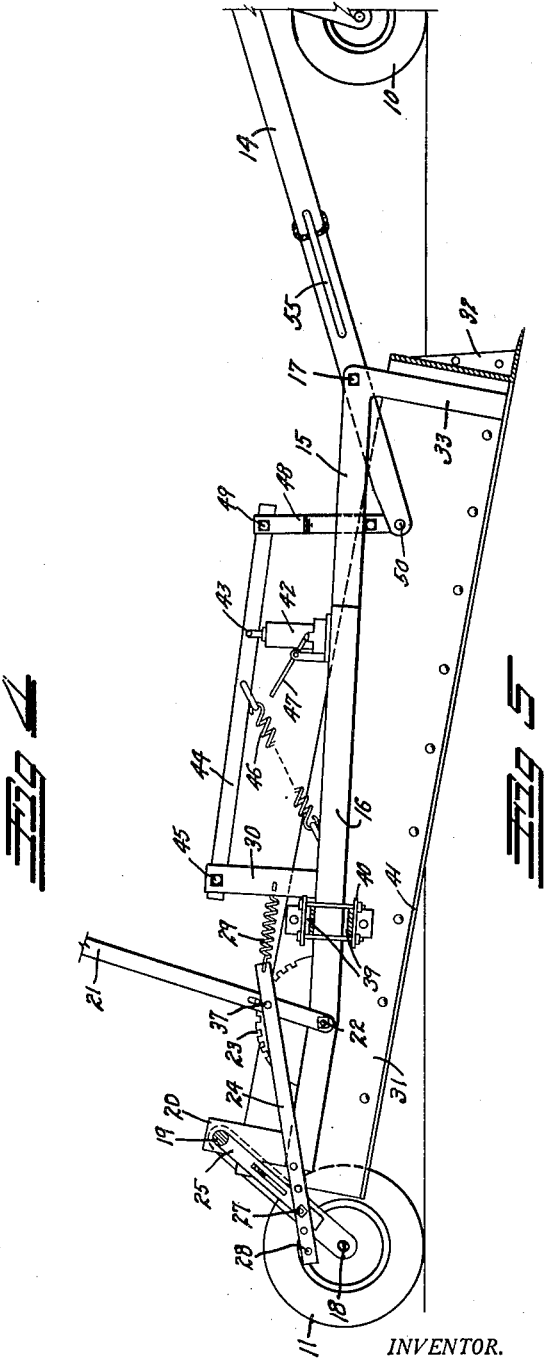
INVENTOR.
JACK SCHWINDT
BY
ATTORNEY Patented Sept. 15, 1953

2,651,858

UNITED STATES PATENT OFFICE 2,651,858

DITCHING PLOW ADJUSTMENT MECHANISM

Jack Schwindt, Fort Morgan, Colo., assignor of fifty per cent to Katherine W. Schwindt, Fort Morgan, Colo.

Application July 16, 1951, Serial No. 236,937

2 Claims. (Cl. 37—98)

1

This invention relates to a plow for digging ditches and building ditch banks, and has for its principal object the provision of a simple and highly efficient ditching plow which can be easily and accurately controlled by the tractor operator; which will form a smooth ditch bottom with an evenly contoured bank in all types of soil and plant growth; which will eliminate the necessity for driving the tractor in or astride the ditch being formed; which can be quickly and easily adjusted to build up the ditch bank on either side of the ditch so as to dig properly formed ditches and banks along hillsides; and which can be quickly and easily elevated for transportation over roads and fields.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved ditching plow;

Fig. 2 is a rear view thereof in the elevated, transportation position;

Fig. 3 is a fragmentary, detail, perspective view illustrating a type of toggle joint employed in the improved ditching plow;

Fig. 4 is a longitudinal section through the plow, taken on the line 4—4, Fig. 1, illustrating the plow in the raised, non-digging position; and Fig. 5 is a similar section, illustrating the plow in a ditch digging position.

The improved ditching plow is supported on a front caster wheel 10 and two rear trailing wheels 11. The caster wheel is journalled in a caster bracket 12 mounted on a caster pivot 13 extending through a tongue member 14 adjacent the forward extremity of the latter. The rear extremity of the tongue member 14 extends between side plates 15 which project forwardly from a plow beam 16. The tongue member 14 is hinged between the forward extremities of the plates 15 on a horizontal hinge bolt 17 and extends rearwardly from the latter between the plates 15.

The rear trailing wheels 11 are mounted in wheel forks 18 fixedly secured on the outer extremities of two horizontal, aligned wheel shafts 19. The inner extremities of the wheel shafts 19 are provided with set collars 58 which rotatably lock them in alignment within a bearing box 20 secured to and extending upwardly from the rear extremity of the plow beam 16. Each wheel shaft 19 may be independently oscillated to swing its wheel 11 upwardly or downwardly through the medium of a hand lever 21. The two levers 21 are mounted on opposite extremities of a lever bolt 22

2 extending through the plow beam 16. Each of the levers 21 may be independently locked in any desired angular position in a notched segment member 23. The segment members 23 are welded on and extend upwardly in parallel relation from the plow beam 16.

Each lever 21 is connected by means of a connecting link 24 with an actuating lever 25 welded or otherwise affixed to one of the wheel shafts 19 adjacent its inner extremity. The levers 25 are braced from the shafts 19 by means of suitable angle braces 26. The connecting links 24 are secured to their respective levers 25 by means of attachment bolts 27, which can be positioned in any selected one of a plurality of spaced openings 28 formed in the links 24 to adjust the operating arcs of the levers 21.

It will be noted that as the levers 21 are swung forwardly, the wheels 11 will also be swung forwardly beneath the ditching plow to elevate either or both sides of the rear extremity of the latter. The weight of the plow is partially counterbalanced by means of counter-balance springs 29 which are tensioned between the forward extremities of the connecting links 24 and upright post members 30, which are welded to, and extend upwardly from the plow beam 16.

The plow beam supports two mold boards 31 arranged in V-shaped relation to each other and joined at their forward extremities by a plow point member 32. The forward extremities of the mold boards 31 and the point member 32 are rigidly supported from the plow beam 16 on downwardly extending supporting arms 33 which are formed on, or attached to, the forward extremities of the side plates 15. A knife plate 41 is secured along the lower edge of each mold board and projects outwardly therefrom for soil cutting purposes.

The rear extremities of the mold boards 31 are suspended from the wheel shafts 19 through the medium of hanger pads 34 which are adjustably secured to the mold boards through the medium of suitable attachment bolts 35 and elongated bolt openings 36.

The mold boards are rigidly supported, separated, and braced from the plow beam 16 by means of horizontal brace bars 39 which overlap each other on the top and bottom of the plow beam 16, the overlapping extremities being clamped together and to the plow beam by means of suitable clamps 40. By releasing the clamps 40 the bars 39 may be slid outwardly or inwardly to increase or decrease the angle of attack of either of the mold boards 31. The hangers 34 slide along the shafts 19 during the adjusting operation. No forward hinge is necessary on the mold boards to accomplish the angle changes, as there is sufficient flexibility in the mold boards and the arms 33 for this purpose.

The connecting point between the tongue member and the plow beam 16 may be raised or lowered through the medium of a hydraulic cylinder 42 and hydraulic plunger 43, which is positioned on the plow beam 16 and acts upwardly against a lifting bar 44 hingedly connected between the upper extremities of the post members 30 upon a suitable hinge bolt 45. The forward extremity of the lifting bar 44 is connected by means of suspension links 48 and upper and lower hinge pins 49 and 50 with the rear extremity of the tongue member 14.

A spring 46 is tensioned between the plow beam 16 and the lifting bar 44 to constantly urge the latter downwardly against the hydraulic plunger 43. The plunger may be actuated from a jack pump handle 47 similarly to a conventional hydraulic jack, or the hydraulic cylinder 42 may be connected to any source of hydraulic pressure on the towing vehicle, as desired. It can be seen that when the hydraulic plunger 43 is actuated upwardly, it will pull the rear extremity of the tongue member 14 upwardly to lift the forward extremity of the plow beam 16 and the mold boards 31 through the medium of the hinge bolts 17, the caster wheel 18 acting as a fulcrum.

If it is desired to have the towing vehicle travel directly along the ditch line, the towing vehicle is connected to a bifurcated hitch 51 on the forward extremity of the tongue member 14. If it is preferred to have the towing vehicle travel along one side of the ditch line, a sidewardly extending draw bar 52 is employed which is hingedly secured in the hitch 51 upon a suitable draw bar bolt 53. The sidewardly extending draw bar 52 is provided with loop members 54, and the tongue member 14 is also provided with oppositely extending loop members 55. A flexible member, such as a chain or cable 56, is secured about the extremity of the draw bar in the loops 54 and about the tongue member 14 in the loops 55.

The towing vehicle is connected to the extremity of the draw bar 52, as indicated at 57, and the drag of the ditching plow is transferred through the chain or cable 56 to the tongue member 14. This enables the towing tractor to travel along one bank of the ditch. It can be transferred to the other bank by simply swinging the draw bar 52 to the opposite side of the tongue member 14.

The tendency of the sideward pull is to cause the rear extremity of the plow to swing toward that side. This tendency, however, is resisted by the draw bar 52, which prevents the forward extremity of the tongue member 14 from swinging to the opposite side.

It is desired to call attention to the various adjustments provided. For instance, the width between the mold boards can be adjusted through the medium of the clamps 40. The relative angle between the hanger pads 34 and the mold boards can be adjusted by varying the position of the elongated bolt openings 36 on the bolts 35. The height to which the wheel shafts may be raised can be adjusted by varying the position of the attachment bolts 27 in the spaced openings 28.

In use, the plow point member 32 is lowered into the ground, by releasing the pressure in the hydraulic cylinder 42, to the depth to which the desired ditch is to be dug. The rear extremities of the mold boards 31 are then lowered through the medium of the levers 21 to allow the former to enter the ground to produce the desired width of the ditch, as indicated in Fig. 5. It will be noted that the deeper the rear extremities of the mold boards penetrate the ground, the wider will be the dug ditch. The extremities of the mold boards projecting above the ground act to form banks on the ditch from the earth dug therefrom.

Should the ditch be laid out on the contour of a hillside, it will, of course, be desirable to place all or most of the ditch bank on the lower side of the ditch. This is accomplished by swinging one of the levers 21 forwardly to raise the mold board on the lower side of the ditch, and by swinging the other lever 21 rearwardly to lower the mold board on the upper side of the ditch. This will cause the major portion of the loosened earth to pile along the lower side of the ditch. If desired, one mold board may be adjusted inwardly toward the plow beam and the other outwardly therefrom to dig a ditch having one side more vertical than the other.

When not in use, the mold boards may be elevated sufficiently high, as shown in Fig. 4, to clear all ground obstructions.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In a ditching plow of the type having mold boards in V-shaped arrangement, the flared extremity of said V being directed rearwardly, said latter extremity being wheel-supported, means for variably supporting the apex of said V comprising: supporting arms secured to and extending upwardly from said mold boards; a horizontal hinge member supported by said arms above the apex of said V; a tongue member tiltably mounted on said hinge member and extending forwardly from said mold boards and rearwardly between the latter; a plow beam extending rearwardly from said arms medially of said mold boards and in fixed relation to the latter; an upright post member mounted on and arising from said plow beam rearwardly of said tongue member; a lifting lever hingedly mounted on said post member and extending forwardly over said tongue member; a suspension link hingedly suspending the rearward extremity of said tongue member from the forward extremity of said lifting lever; and variable supporting means supported on said plow beam below said lifting lever and acting upwardly against said lifting lever to cause said link to swing the rear extremity of said tongue member upwardly.

2. Means for variably supporting the apex of a ditching plow as described in claim 1 in which the variable supporting means comprises: a hydraulic cylinder mounted on said plow beam; a plunger extending upwardly from said cylinder into contact with said lifting lever to lift the latter; and a spring tensioned between said plow beam and said lifting lever and urging the latter downwardly.

JACK SCHWINDT.

References Cited in the file of this patent

UNITED STATES PATENTS

| Number | Name | Date |
| --- | --- | --- |
| 774,458 | Sylvestersen | Nov. 8, 1904 |
| 2,261,874 | Cundiff | Nov. 4, 1941 |
| 2,426,847 | Smith | Sept. 2, 1947 |

FOREIGN PATENTS

| Number | Country | Date |
| --- | --- | --- |
| 8,517 | Great Britain | May 28, 1840 |